(12) United States Patent
Kuo

(10) Patent No.: US 8,429,807 B2
(45) Date of Patent: Apr. 30, 2013

(54) ALUMINUM-PLASTIC COMPOSITE STRUCTURE

(75) Inventor: Shien-Cheng Kuo, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/074,134

(22) Filed: Mar. 29, 2011

(65) Prior Publication Data

US 2012/0003444 A1    Jan. 5, 2012

(30) Foreign Application Priority Data

Jun. 30, 2010 (CN) .......................... 2010 1 0214877

(51) Int. Cl.
*B21D 39/00* (2006.01)
(52) U.S. Cl.
USPC .......... 29/527.1; 29/527.2; 29/527.3; 269/21; 269/903; 264/272.11; 264/272.12
(58) Field of Classification Search .................. 29/527.1, 29/527.2, 527.3; 269/21, 903; 264/272.11, 264/272.12, 272.13
See application file for complete search history.

(56) References Cited

U.S. PATENT DOCUMENTS

| | | | | |
|---|---|---|---|---|
| 3,257,260 A * | 6/1966 | Morgan | ........................ | 428/118 |
| 3,326,717 A * | 6/1967 | Gregor et al. | ................. | 430/314 |
| 3,388,000 A * | 6/1968 | Lovelace et al. | ............. | 438/570 |
| 3,390,025 A * | 6/1968 | Strieter | ........................ | 438/552 |
| 3,702,277 A * | 11/1972 | Lerner | ..................... | 156/345.17 |
| 3,808,067 A * | 4/1974 | Brown | ............................ | 216/85 |
| 4,254,544 A * | 3/1981 | Barker | ......................... | 29/527.3 |
| 4,669,416 A * | 6/1987 | Delgado et al. | ............... | 118/503 |
| 4,902,365 A * | 2/1990 | Westlake, Sr. | .............. | 156/273.9 |
| 5,045,141 A * | 9/1991 | Salensky et al. | .............. | 156/240 |
| 5,499,441 A * | 3/1996 | Dunton et al. | ............... | 29/527.2 |
| 5,660,380 A * | 8/1997 | Reis et al. | ......................... | 269/21 |
| 5,800,661 A * | 9/1998 | Reis et al. | ..................... | 156/285 |
| 5,906,363 A * | 5/1999 | Reis et al. | ......................... | 269/21 |
| 6,182,486 B1 * | 2/2001 | Chuang | .............................. | 72/46 |
| 6,531,080 B1 * | 3/2003 | Ehrfeld et al. | ................. | 264/139 |
| 6,532,641 B2 * | 3/2003 | Hillier | .......................... | 29/527.4 |
| 6,586,677 B2 * | 7/2003 | Glenn | .......................... | 174/528 |
| 6,746,890 B2 * | 6/2004 | Gupta et al. | ..................... | 438/50 |
| 6,773,644 B1 * | 8/2004 | Eiden | ............................ | 264/132 |
| 6,790,396 B2 * | 9/2004 | Eiden et al. | ................... | 264/132 |
| 6,930,256 B1 * | 8/2005 | Huemoeller et al. | ......... | 174/260 |
| 7,217,890 B2 * | 5/2007 | Suemasu et al. | .............. | 174/264 |
| 7,353,600 B2 * | 4/2008 | Tsukahara et al. | .............. | 29/852 |
| 7,393,699 B2 * | 7/2008 | Tran | ................................ | 438/1 |
| 7,880,258 B2 * | 2/2011 | Bui et al. | ....................... | 257/465 |
| 2001/0010854 A1 * | 8/2001 | Hillier | .............................. | 428/73 |
| 2002/0146639 A1 * | 10/2002 | Brock et al. | ................. | 430/270.1 |
| 2004/0192041 A1 * | 9/2004 | Jeong et al. | ................... | 438/689 |
| 2007/0285843 A1 * | 12/2007 | Tran | .......................... | 360/245.9 |
| 2008/0152953 A1 * | 6/2008 | Lim | ................................ | 428/827 |
| 2008/0243231 A1 * | 10/2008 | Flanagan et al. | ............. | 623/1.16 |
| 2009/0157166 A1 * | 6/2009 | Singhal et al. | ............... | 623/1.15 |
| 2010/0126688 A1 * | 5/2010 | Sekine et al. | ................... | 164/61 |

* cited by examiner

*Primary Examiner* — Jermie Cozart
*Assistant Examiner* — Bayan Salone
(74) *Attorney, Agent, or Firm* — Altis Law Group, Inc.

(57) ABSTRACT

An aluminum-plastic composite structure includes an aluminum portion and a plastic portion. The aluminum portion defines a plurality of micro grooves by ultraviolet lithography. The plastic portion is integrally formed on the aluminum portion and substantially filling in the micro grooves. A width of each micro groove is in a range from 0.02 millimeters to 0.05 millimeters. A depth of each micro groove is in a range from 0.2 millimeters to 0.25 millimeters.

7 Claims, 2 Drawing Sheets

ALUMINUM-PLASTIC COMPOSITE STRUCTURE

BACKGROUND

1. Technical Field

The present disclosure relates generally to an aluminum-plastic composite structure.

2. Description of Related Art

Many aluminum-plastic composite structures used in electronic devices include a metal member and a plastic member fixed on the metal member. The plastic member is adhered on the metal member by glue. However, strength of the bond formed using the glue will decrease over time, and may result in detachment of the metal from the plastic.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
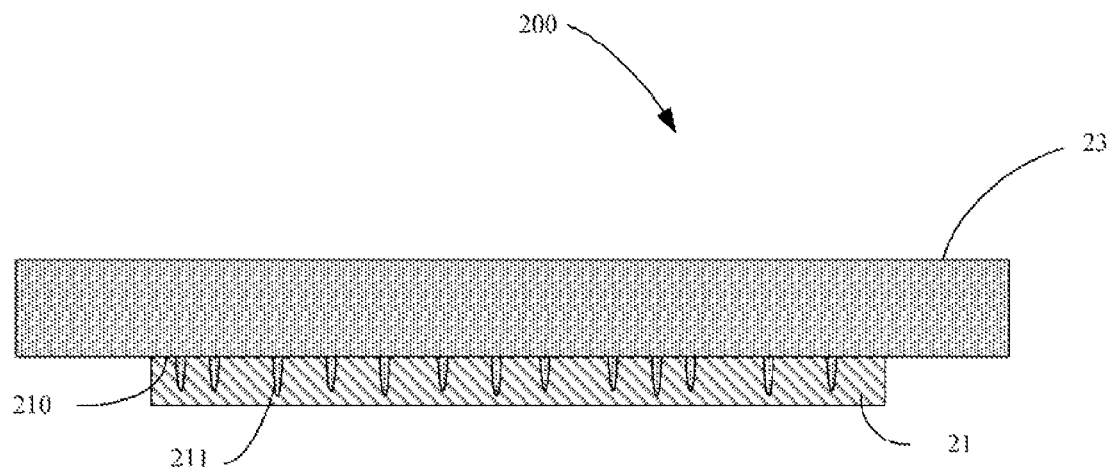
FIG. 1 is a cross section of an embodiment of an aluminum-plastic composite structure.

Referring to FIG. 1, an embodiment of an aluminum-plastic composite structure 200 includes an aluminum portion 21 and a plastic portion 23 integrally formed on the aluminum portion 21 by insert-molding technology. The aluminum portion 21 includes a joining surface 210. The aluminum portion 21 includes a plurality of micro grooves 211 in the joining surface 210 made by using ultraviolet lithography. A width of each micro groove 211 is in a range from 0.02 millimeters to 0.05 millimeters, and a depth of each micro groove 211 is in a range from 0.2 millimeters to 0.25 millimeters, thus the plastic material can be effectively injected into the micro grooves 211 to enhance strength of the bond formed between the aluminum portion 21 and the plastic portion 23. In this embodiment, a ratio of the depth to the width is equal to or greater than 10. In the illustrated embodiment, the aluminum portion 21 is a sheet, and the depth of the micro grooves 211 is less than 80% of the thickness of the aluminum portion 21 where the micro grooves 211 are defined to maintain bonding strength of the aluminum portion 21 with respect to the plastic portion 23. The aluminum portion 21 may be made of aluminum or aluminum alloy, the micro grooves 211 may be easily defined because of the cubic crystal structure of aluminum.

Figure 2:
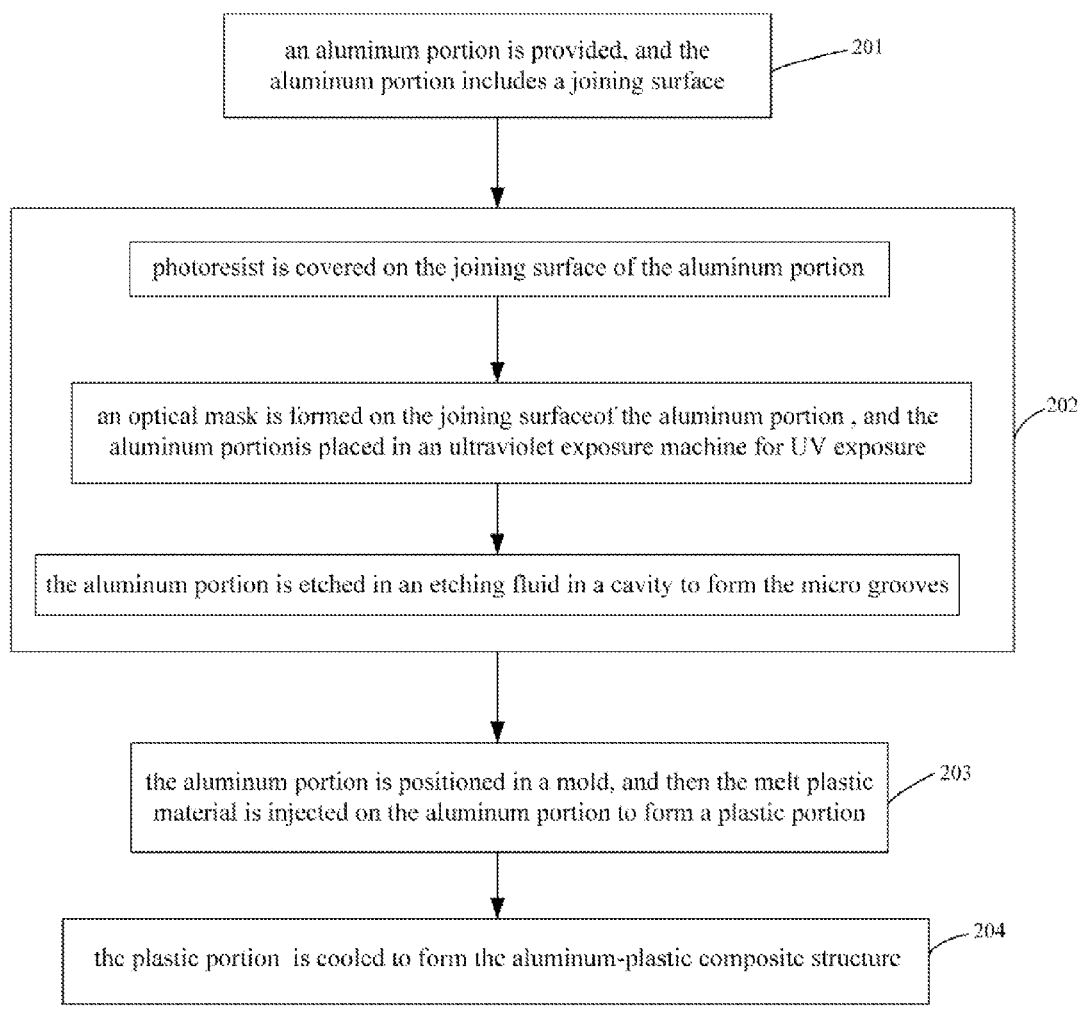
FIG. 2 is a flowchart of a method for making the aluminum-plastic composite structure.

Also referring to FIG. 2, a method for making aluminum-plastic composite structure follows.

In step 201, an aluminum portion 21 is provided, and the aluminum portion 21 includes a joining surface 210;

In step 202, a plurality of micro grooves 211 are formed in the joining surface 210 by ultraviolet lithography, a width of each micro groove is in a range from 0.05 mm to 0.05 mm; a depth of each micro groove is in a range from 0.2 mm to 0.25 mm. The process of ultraviolet lithography for defining the micro grooves 211 includes the following steps:

(1) Photoresist is covered on the joining surface 210 of the aluminum portion 21.

(2) An optical mask is formed on the joining surface 210 of the aluminum portion 21, and the aluminum portion 21 is placed in an ultraviolet exposure machine for UV exposure.

(3) The aluminum portion 21 is etched in an etching fluid in a cavity to form the micro grooves 211, in which a size of the micro groove is being controlled by adjusting the concentration of the etching fluid and/or an etching duration.

In step 203, the aluminum portion 21 is positioned in a mold, and then the melt plastic material is injected on the aluminum portion 21 to form a plastic portion 23. The plastic material is injected and substantially filling into the micro grooves 211, thus the plastic portion 23 can be bonded or fixed on the joining surface 210 of the aluminum portion 21.

In step 204, the plastic portion 23 is cooled to form the aluminum-plastic composite structure 200.

The aluminum-plastic composite structure 200 defines the micro grooves 211 at the joining surface 210 of the aluminum portion 21 in which the plastic material is embedded, thus firmly fixing or bonding the plastic portion 23 on the aluminum portion 21, and increasing the bond strength between the aluminum portion 21 and the plastic portion 23. The aluminum-plastic composite structure 200 also has a reduced thickness because no latching mechanism is included.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A method for making an aluminum-plastic composite structure comprising:
   providing an aluminum portion and the aluminum portion defining a joining surface;
   defining a plurality of micro grooves in the joining surface of the aluminum portion by using ultraviolet lithography, a width of each micro groove being in a range from about 0.02 millimeters to about 0.05 millimeters, a depth of each micro groove being in a range from about 0.2 millimeters to about 0.25 millimeters;
   positioning the aluminum portion in a mold, and then injecting plastic material into the mold to form a plastic portion, and a portion of the plastic material being injected and substantially filling in the micro grooves; and
   cooling the plastic material.

2. The method for making the aluminum-plastic composite structure of claim 1, wherein a ratio of the depth to the width is equal to or greater than 10.

3. The method for making the aluminum-plastic composite structure of claim 1, wherein the aluminum portion is a sheet, the depth of each micro groove is equal to or less than 80% of a thickness of the aluminum portion where the micro groove are defined.

4. The method for making the aluminum-plastic composite structure of claim 1, wherein defining the micro grooves at the joining surface comprises a first step of covering a photoresist on the joining surface, a second step of forming an optical mask on the joining surface and placing the aluminum portion in an ultraviolet exposure machine for UV exposure; and a third step of etching the aluminum portion in an etching fluid to form the micro grooves.

5. The method for making the aluminum-plastic composite structure of claim 1, wherein the aluminum portion is made of aluminum or aluminum alloy.

6. The method for making the aluminum-plastic composite structure of claim 1, wherein a size of the micro groove is controlled by adjusting a concentration of the etching fluid and an etching duration.

7. The method for making the aluminum-plastic composite structure of claim 1, wherein a size of the micro groove is controlled by adjusting a concentration of the etching fluid or an etching duration.

\* \* \* \* \*